(12) United States Patent
Parkinson et al.

(10) Patent No.: US 9,984,096 B2
(45) Date of Patent: May 29, 2018

(54) SYSTEM AND METHOD FOR REDUCING COMMUNICATIONS OVERHEAD IN A DISTRIBUTED TRANSACTIONS ENVIRONMENT BY MODIFYING IMPLEMENTATION OF THE TRANSACTION START FUNCTION

(71) Applicant: Oracle International Corporation, Redwood Shores, CA (US)

(72) Inventors: Paul Parkinson, Mount Laurel, NJ (US); Todd J. Little, Palatine, IL (US); Carol Colrain, Redwood Shores, CA (US); Jean De Lavarene, Versailles (FR); Vivekanandhan Raja, Fremont, CA (US); Douglas Surber, Orinda, CA (US); Stefan Roesch, San Mateo, CA (US); Nancy Ikeda, Los Altos Hill, CA (US); Kevin Neel, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 246 days.

(21) Appl. No.: 15/087,895

(22) Filed: Mar. 31, 2016

(65) Prior Publication Data
US 2016/0294723 A1    Oct. 6, 2016

Related U.S. Application Data

(60) Provisional application No. 62/140,544, filed on Mar. 31, 2015.

(51) Int. Cl.
*G06F 17/30* (2006.01)
*G06F 9/46* (2006.01)

(52) U.S. Cl.
CPC ......... *G06F 17/30227* (2013.01); *G06F 9/46* (2013.01)

(58) Field of Classification Search
CPC ....... G06F 17/30227; G06F 9/46; G06F 9/466
(Continued)

(56) References Cited

U.S. PATENT DOCUMENTS 5,920,863 A * 7/1999 McKeehan ............. G06F 9/466
707/741
6,301,606 B1 * 10/2001 Chessell ................. G06F 9/466
705/35

(Continued)

OTHER PUBLICATIONS

Distributed Transaction Processing: The XA Specification, Dec. 1991, X/Open Company Limited, p. 16.*

(Continued)

*Primary Examiner* — Thomas Dailey
*Assistant Examiner* — Lam Duong
(74) *Attorney, Agent, or Firm* — Tucker Ellis LLP (57) ABSTRACT

A system and method for reducing communications overhead in a distributed transaction processing environment such as an XA environment. In accordance with an embodiment communication overhead is reduced in a transaction start method by deferring a transaction start communication. The deferred transaction start communication is determined from a subsequent transaction processing communication thereby reducing the number of networks calls required for each transaction and enhancing system performance.

20 Claims, 3 Drawing Sheets

(58) Field of Classification Search
USPC .......................................................... 709/226
See application file for complete search history.

(56) References Cited

U.S. PATENT DOCUMENTS

| | | | | |
|---|---|---|---|---|
| 6,463,456 B1* | 10/2002 | Kan | ........................ | G06F 9/466 |
| | | | | 709/201 |
| 2007/0083544 A1* | 4/2007 | Somogyi | ................. | G06F 9/466 |
| 2011/0055835 A1* | 3/2011 | Dennis | .................... | G06F 9/466 |
| | | | | 718/101 |
| 2012/0005330 A1* | 1/2012 | Moran | .................... | G06F 9/466 |
| | | | | 709/224 |
| 2014/0157276 A1* | 6/2014 | Smithson | ................ | G06F 9/466 |
| | | | | 718/101 |

OTHER PUBLICATIONS

Oracle® Fusion Middleware, Programming Advanced Features of JAX-WS Web Services for Oracle WebLogic Server, 11g Release 1 (10.3.4), 256 pages, Jan. 2011.

* cited by examiner

SYSTEM AND METHOD FOR REDUCING COMMUNICATIONS OVERHEAD IN A DISTRIBUTED TRANSACTIONS ENVIRONMENT BY MODIFYING IMPLEMENTATION OF THE TRANSACTION START FUNCTION

CLAIM OF PRIORITY

This application claims the benefit of priority on U.S. Provisional Patent Application No. 62/140,544 filed Mar. 31, 2015 entitled "SYSTEM AND METHOD FOR REDUCING COMMUNICATIONS OVERHEAD IN A DISTRIBUTED TRANSACTIONS ENVIRONMENT BY MODIFYING IMPLEMENTATION OF THE TRANSACTION START FUNCTION" which application is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to systems and methods for distributed transaction processing.

BACKGROUND

In today's computing environment the use of distributed or "global" transactions is becoming more widespread with the adoption of Java EE component based architectures. The XA standard is an X/Open specification for distributed transaction processing (DTP) across heterogeneous data sources (e.g. Oracle Database and DB2) that was published in 1991. A general overview of the XA specification for distributed transaction processing, including basic architecture Information can be found in the "X/Open CAE Specification—Distributed Transaction Processing: The XA Specification" (X/Open 1991) which is incorporated herein by reference. A copy of this document can be obtained by requesting X/Open Document No. XO/CAE/91/300 or ISBN 1 872630 24 3 from X/Open Company, Ltd., 1010 El Camino Real, Suite 380, Menlo Park, Calif. 94025, U.S.A. The XA specification describes the interface between the transaction coordinator and the data sources that participate in the distributed transaction. Within XA the transaction coordinator is termed the transaction manager and the participating data sources are termed the resource managers. Transaction managers and resource managers that follow the XA specification are said to be XA compliant.

Some products such as the Oracle database and Oracle WebLogic Server can act as either transaction managers or resource managers or both within the same XA transaction. Examples of XA transaction managers are: Oracle® Tuxedo, Oracle® WebLogic Server, the Oracle® database and IBM® WebSphere Application Server. Examples of XA resource managers are: Oracle® Database, IBM® DB2, MS-SQL, IBM® MQ-Series and Java Message Service (JMS). Additional information concerning design implications when using XA or Oracle® controlled distributed transactions can be found in "Oracle White Paper—XA and Oracle controlled Distributed Transactions" (Oracle 2010) which is incorporated herein by reference.

The XA specification thus describes a protocol and interface between an application server, transaction manager and one or more resource managers. The XA specification enables a plurality of resources, such as application servers and databases, to be accessed within the same transaction, thus preserving the ACID (atomicity, consistency, isolation, durability) properties of the transaction in a distributed transaction processing environment.

In order to ensure interoperability of components, the XA specification requires implementation of particular communications between the application server, transaction manager and one or more local resource managers. However such communications require a communications overhead that consumes network resources and introduces additional latency.

SUMMARY

A system and method is provided for reducing communications overhead in a distributed transaction processing environment such as an XA environment. In accordance with an embodiment, communication overhead is reduced in a transaction start method by deferring a transaction start communication. The deferred transaction start communication is determined from a subsequent transaction processing communication thereby reducing the number of networks calls required for each transaction, reducing latency, and enhancing system performance.

Other objects and advantages of the present invention will become apparent to those skilled in the art from the following detailed description of the various embodiments, when read in light of the accompanying drawings.

DETAILED DESCRIPTION

In the following detailed description, the invention will be illustrated by way of example and not by way of limitation in the figures of the accompanying drawings. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention. In particular, the detailed description uses an XA distributed transaction environment as an example. It will be apparent to those skilled in the art that the present invention has application to other types of distributed transaction environment without limitation.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the figures in which the element first appears.

A Transactional Environment and Global Transaction

Figure 1:
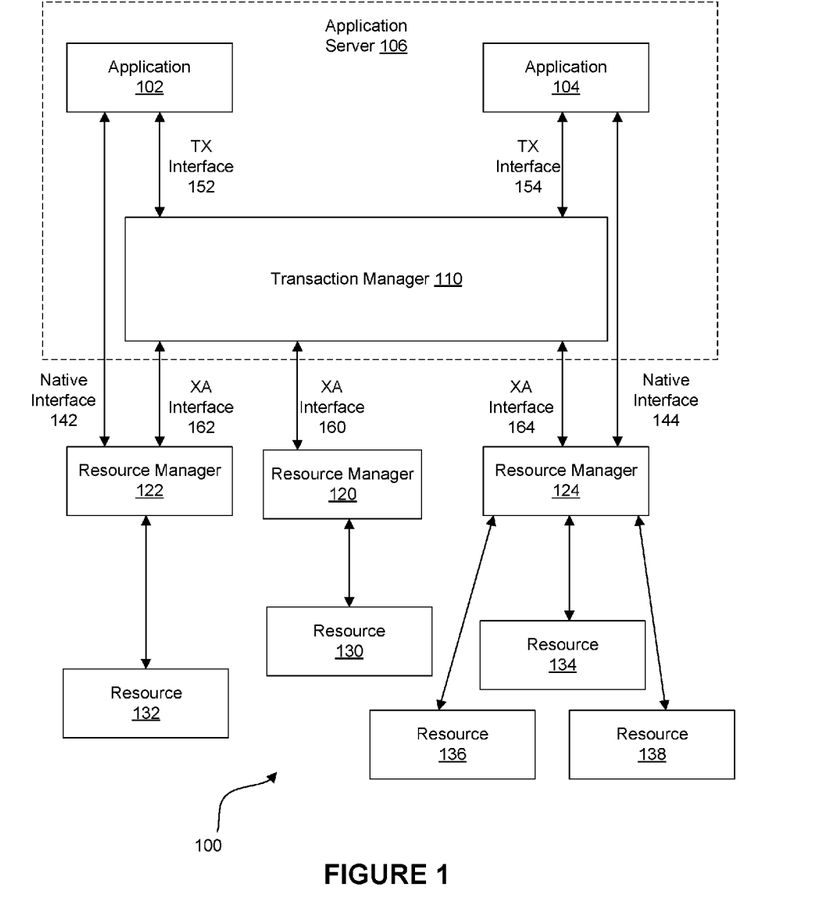
FIG. 1 shows an illustration of a distributed transactional environment, in accordance with an embodiment of the invention.

FIG. 1 illustrates a distributed transaction processing environment 100, in accordance with an embodiment of the invention. As shown in FIG. 1, each of one or more resource manager 120, 122, 124, controls access to one or more resources 130, 132, 134, 136, and 138. Examples of resources can include messaging systems, relational databases, and transactional file systems. A distributed transaction is one that includes updates to multiple resources—the transaction comprises multiple branches, each of which is a unit of work contained within a resource manager. A transaction manager 110 coordinates the flow of transaction requests between client applications 102, 104 that issue requests, and resources 130, 132, 134, 136, 138 that will be used to process those requests, including synchronizing any commits or rollbacks required to complete the transaction. Examples of commercially available transaction processing monitors include Oracle® Tuxedo, Oracle® WebLogic Server and application server-type systems.

The plurality of resource managers 120, 122, 124 provide access to resources 130, 132, 134, 136, 138 that can be, for example, persistence stores such as databases. The persistence stores can be in-memory or disk based. In accordance with an embodiment of the invention, the plurality of resource managers 120, 122, 124 implement XA interfaces 160, 162, 164 to handle database connections and disconnections transparently to persistence stores. The XA interfaces 160, 162, 164 are based on a specification that describes the protocol for transaction coordination, commitment, and recovery. An XA resource participating in a transaction can comprise an XA resource manager and a backend persistence store.

A distributed transaction processing environment may comprise a large number of resource managers and resources. Different resource managers and resources may participate in different transactions depending on the resource needs of the transaction. To put it another way, a particular subset of the available plurality resources may be required for a particular transaction. The particular subset of the available plurality resources and the resource managers managing those resources can be described as participating in the transaction or as participating resource managers. Other resources/resource managers may not be required for a particular transaction—non-participating. For different transactions different resources and resource managers may be required. Thus those resource managers participating in a first transaction may be different than those participating in a second transaction.

In accordance with embodiments of the invention, the applications 102, 104 hosted on application server 106 can specify actions that constitute a transaction. As illustrated, the applications 102, 104 communicate with the transaction manager 110 to start, and commit or abort, each transaction, and the transaction manager 110 can acknowledge the successful completion or failure of the start, end and disposition of each transaction to the applications 102, 104. The transaction manager 110 provides an application programming interface (in XA-based environments the XA protocol and its TX interfaces 152, 154) that enable the applications 102, 104 to specify the boundaries of each transaction. In accordance with embodiments of the present invention, the communications of the XA protocol implemented by the transaction manager 110 and resource managers 122, 124 to specify the boundaries of each transaction are modified to reduce communications overhead. In particular communication overhead is reduced in a transaction start method by deferring a transaction start communication as described below thereby reducing the number of network calls required for each transaction and enhancing system performance. The application server 106, transaction manager 110, and resource managers 122, 124 are configured to implement the reduced overhead method described below and illustrated in FIG. 3.

Each transaction monitor implements a two-phase commit protocol to provide all-or-none semantics across its distributed resource managers. During a prepare phase of a transaction, the transaction monitor uses its XA interface 162, 164 to ask each resource manager participating in a transaction to guarantee that it can commit its part of the transaction. If this is possible, then the resource manager records its prepared state and replies affirmatively to the transaction monitor; if not then the resource manager might roll back any work and reply negatively to the transaction monitor. The XA protocol allows the applications 102, 104, or any of the resource managers 122, 124, to roll back the transaction unilaterally until the prepare phase completes. During a commit phase of a transaction, the transaction manager 110 records the commit decision and issues either a commit or rollback to all resource managers 102, 104 participating in the transaction. The transaction processing monitor 11 issues a commit for a resource manager 122, 124 only if all of the resource managers 102, 104 participating in the transaction have replied affirmatively during the prepare phase.

Although the applications 102, 104 can specify the transaction boundaries and the actions that constitute a transaction via transaction manager 110, the application otherwise operates on each resource manager through its native interface 142, 144. For example, in the case of a SQL-based database resource, the application might operate on the database's resource manager using SQL commands via the native interface. The applications 102, 104 can thus communicate directly with the plurality of resource managers 122-124 via e.g. embedded Structured Query Language (SQL) to do useful work.

In accordance with various embodiments of the invention, a transactional system can support a global transaction, which can be executed on more than one server, and is capable of accessing data from more than one resource manager.

A global transaction can be treated as a specific sequence of operations that are characterized by the four properties of atomicity, consistency, isolation, and durability (ACID). The global transaction can be a logical unit of work that has the following features:

All portions either succeed or have no effect.

Operations are performed that correctly transform the resources from one consistent state to another.

Intermediate results are not accessible to other transactions, although other processes in the same transaction may access the data.

All effects of a completed sequence cannot be altered by any kind of failure.

Furthermore, a global transaction may include several local transactions, each accessing a single resource manager. A local transaction can access a single database or file and can be controlled by the resource manager responsible for performing concurrency control and atomicity of updates at that distinct database. A given local transaction may be either successful or unsuccessful in completing its access.

Additionally, the transaction manager 110 can assign global transaction identifiers (GTRIDs) to the different transactions in transactional environment 100. The transaction manager 110 monitors the progress of transactions, and take responsibility for ensuring transaction completion and providing failure recovery. In addition, the transaction manager 110 can communicate with the plurality of resource managers 122-124 via XA interfaces to exchange transaction information, such as sending two-phase commits calls to the resource managers 122, 124.

Standard XA Interface

The XA routines are supplied by resource managers operating in the distributed transaction environment and called by transaction monitors. When an application calls a transaction monitor to start a global transaction, the transaction monitor may use the XA interface to inform resource managers of the transaction branch. After the application uses the resource manager's native interface to do work in support of the global transaction, the transaction monitor calls additional XA routines to commit or roll back branches. One other XA routine helps the transaction monitor coordinate failure recovery.

Figure 2:
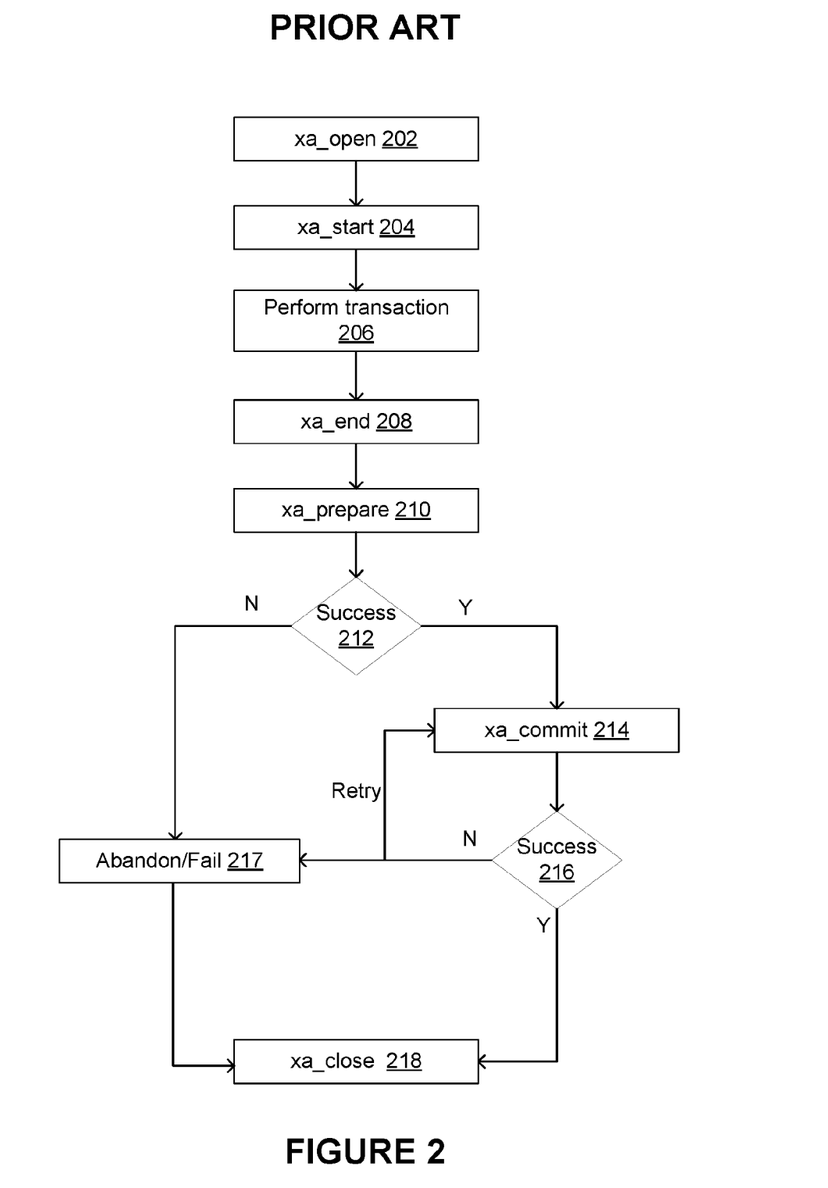
FIG. 2 shows a conventional sequence of steps for an XA transaction.

At step 204, xa_start is called by the transaction manager to start one or more transaction branches and associate an XID with future work that the thread requests of the resource managers participating in the transaction. If there are multiple resource managers (e.g. 122, 124 of FIG. 1) participating in the transaction, each resource manager is a separate branch. Resource managers must respond to the transaction manager to acknowledge successful performance of the xa_start routine before the transaction proceeds (or communicate an exception if the routine failed). Note that particular transactions may not involve all resources/resource managers. Transaction-specific communications as described herein need only be performed with respect to resource managers participating in a particular transaction and not other resource managers (e.g. 120 of FIG. 1) which are not participating in a particular transaction.

At step 206, the application 102 goes ahead with the transaction. For example, the application can perform a transaction in a database using by communicating with the plurality of resource managers 122-124 via a native interface such as e.g. embedded Structured Query Language (SQL) to do useful work in a database.

Note that, the xa_start call (step 204) is transmitted from the transaction manager 110 over the XA Interface 162, 164 to the resource managers 122, 124 (See FIG. 1). The connection/statement/execute/work call (step 206) is made by the application 102, 104 to the resource manager 122, 124 over the native interface 142, 144 using e.g. SQL commands.

At step 208, xa_end is called by the transaction manager to mark the end of the transaction on each transaction branch and dissociate an application thread from the transaction branches. All participating resource managers must respond to the transaction manager to acknowledge successful per-

TABLE I

| Name | Description |
| --- | --- |
| xa_close | Terminate the applications use of a resource manager. |
| xa_commit | Tell the resource manager to commit a transaction branch. |
| xa_complete | Test an asynchronous XA operation for completion. |
| xa_end | Dissociate the thread from a transaction branch. |
| xa_forget | Permit the resource manager to discard its knowledge of a heuristically-completed transaction branch. |
| xa_open | Initialize a resource manager for use by an application. |
| xa_prepare | Ask the resource manager to prepare to commit a transaction branch. |
| xa_recover | Get a list of XIDs the resource manager has prepared or heuristically completed. |
| xa_rollback | Tell the resource manager to roll back a transaction branch. |
| xa_start | Start or resume a transaction branch - associate an XID with future work that the thread requests of the resource manager. |

A list of conventional XA routines is provided in Table I above. A transaction processing monitor calls the XA routines in a particular sequence specified in the XA protocol. FIG. 2 is a chart showing the conventional flow of calls when performing a transaction in a distributed database using XA protocol.

At step 202, xa_open is called by the transaction manager to initialize one or more resource managers and prepare them for use in a distributed transaction environment. All participating resource managers must respond to the transaction manager to acknowledge successful performance of the xa_open routine before the transaction proceeds (or communicate an exception if the routine failed). Note that xa_open is not actually implemented by Java XA such as Oracle® WebLogic Server but is implemented in C implementations such as Oracle® Tuxedo.

formance of the xa_end routine before the transaction proceeds (or communicate an exception if the routine failed).

At step 210, xa_prepare is called by the transaction manager as the first phase of the two phase commit. All participating resource managers must respond to the transaction manager to acknowledge successful performance of the xa_prepare routine for the transaction to succeed.

At step 212, if one or more of the resource managers do not respond positively to the xa_prepare call, xa_rollback is called by the transaction manager.

At step 214, if all of the resource managers respond positively to the xa_prepare call, xa_commit is called by the transaction manager. All participating resource managers must respond to the transaction manager to acknowledge successful performance of the xa_commit routine for the transaction to succeed.

At step 216, if one or more of the resource managers do not respond positively to the xa_commit call, depending on the XA error code returned, xa_commit will be retried or the transaction will be abandoned at step 217. At this point the transaction has either succeeded and been committed on all participating resource managers or has failed on all participating resource managers. The transaction thus satisfies the atomicity requirement of the global transaction—namely a global transaction can be treated as a specific sequence of operations that are characterized by the four properties of atomicity, consistency, isolation, and durability (ACID). The global transaction can be a logical unit of work that has the following features:

Finally, at step 218, the transaction manager 110 calls xa_close to all of the participating resource managers 122, 124. Most of the above sequence of steps is performed for each transaction performed by the applications 102, 104 using the resources 132, 134, 136, 138. Note however that xa_open and xa_close are typically only called on application startup and application shutdown instead rather than for each transaction. Note also that xa_open and xa_close are not actually implemented by Java XA such as Oracle® WebLogic Server but are implemented in C implementations such as Oracle® Tuxedo.

XA Interface with Reduced Communication Overhead

The Java Transaction API (JTA), one of the Java Enterprise Edition (Java EE) APIs, enables distributed transactions to be done across multiple X/Open XA resources in a Java environment. The JTA is modelled on the X/Open XA architecture, but it defines two different APIs for demarcating transaction boundaries. It distinguishes between an application server such as an EJB server and an application component. It provides an interface, javax.transaction.TransactionManager, that is used by the application server 106 itself to begin, commit and rollback the transactions. It provides a different interface, the javax.transaction.UserTransaction, which is used by general application client code 102, 104 such as a servlet or an EJB to manage the transactions.

The Java Transaction API (JTA) consists of three elements: a high-level application transaction demarcation interface, a high-level transaction manager interface intended for an application server 106, and a standard Java mapping of the XA protocol intended for a transactional resource manager 122, 124. The javax.transaction.UserTransaction interface provides the application the ability to control transaction boundaries programmatically. This interface may be used by Java client programs or EJB beans.

A global/XA transaction Java application generally has the following form:
1. userTransaction.begin( ) //A global transaction is demarcated using JTA;
2. connection1.prepareStatement( ).execute( ); //Work is conducted on a resource manager such as a database;
3. connection2.prepareStatement( ).execute( ); //Work is conducted on another resource manager such as a database; and
4. userTransaction.commit( ); //A global transaction is completed/committed using JTA.

The UserTransaction.begin( )method starts a global transaction and associates the transaction with the calling thread of the application. The transaction-to-thread association is managed transparently by the transaction manager 110. The application server 106 intercepts or wraps the application's 102, 104 first connection/statement execute/work call to a resource manager 122, 124 and first calls xa_start on the resource manager 102, 104 in order to demarcate the transaction on the resource manager side. Note that xa_open and xa_close are not actually implemented by Java XA.

This xa_start call is a full roundtrip network call to the resource manager/database from the application server resulting in communication overhead and delay resulting from the transmission of the call to resource manager and the response (ACK or XAException) from the resource manager 122, 124 to the application server 106. If this xa_start call is successful, then the actual connection/statement execute/work call is executed and it is done so in the context of the XA transaction setup by the xa_start call.

In an embodiment of the present invention, the communications overhead of the transaction initiation pattern is reduced by deferring the xa_start call and either bundling it with the first execute/work call or allowing the resource manager to determine the existence of the xa_start call from the receipt of the subsequent first execute/work call at the resource manager thus eliminating an entire network call for each resource manager in each transaction. The elimination of an entire network call for each resource manager in each transaction reduces the communications overhead and delay compared to the transaction initiation pattern of e.g. FIG. 2.

In order to eliminate the explicit xa_start call and determine/infer the xa_start call from the xa_start call from the subsequent first execute/work call to the resource manager the following procedure is used. First, when xa_start is called by the application server it is done with a special DEFERRED flag rather than the TMNOFLAGS flag used currently. TMNOFLAGS is used to indicate no flags value is selected. This use of the special DEFFERRED flag sets a flag locally on the application server 106 and does not make a remote call to the resource manager 122, 124 for xa_start. The application server 106 proceeds to issue the connection/statement execute/work call without waiting for a response to the xa_start call (because the call was not actually communicated). The connection/statement execute/work call (or an indication thereof) can be bundled with the xa_start call. When the connection/statement execute/work call is made, the resource manager 122, 124 receives the request and conducts the necessary work that would have resulted from both an explicit xa_start call and also conducts the actual/statement work.

When the resource manager conducts the necessary work that would have resulted from an explicit xa_start, an XA exception could result. Also, if the xa_start is successful, when the resource manager conducts the necessary work for the actual/statement work, a SQLException can occur. Either of these exceptions will be transmitted from the resource manager in the form of a SQLException thrown in response to the connection/statement execute/work call. However, the SQLException will inherit or nest an XAException if it was actually an XA exception that was thrown. Thus, the application server 106 will be informed whether an XAException or a SQLException was thrown.

The application server 106 will inspect the received SQLException to determine whether it is communicating an actual SQLException arising from a failure in performing work in response to the connection/statement execute/work call or whether it is communicating an XA exception to the xa_start call. The application server 106 and/or transaction manager 110 will then process either exception. For example, in response to an XAException from any participating resource manager, the application server can discontinue the present transaction.

A further enhancement can be performed as follows. When the resource manager 122, 124 receives the execute/work call for example a SQL command, the resource manager (unlike the calling application server/transaction monitor) can examine the execute work call to determine whether an XA transaction actually needs to be started for the work. For example, if the work is entirely read only there is no need to start an XA transaction for the work because there are no changes which will be made to the resource contents. If the resource manager determines from examining the execute work call that an XA transaction is unnecessary, the resource manager will not perform the work that would have resulted from an explicit xa_start call is not conducted. A Boolean value is returned to the application server as part of the execute/work call response (e.g. as a variable set on the XAResource object) indicating whether an XA transaction has actually been started by the database where a value of true indicates the database has started an XA transaction and a value of false indicates the database has not started a XA transaction due to the fact that none of the work issued necessitated a transaction. Thus, the resource manager avoids performing xa_start work in response to an execute work call where no XA transaction is required.

Figure 3:
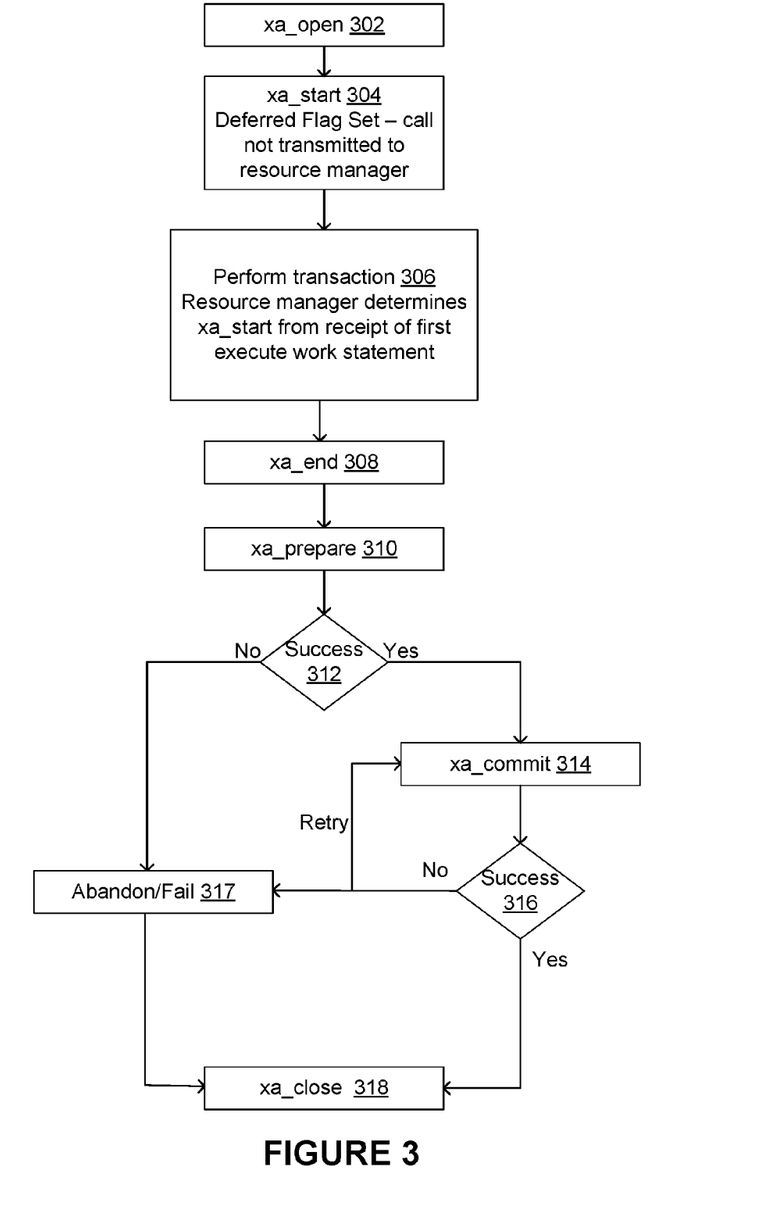
FIG. 3 shows a sequence of steps for an XA transaction with reduced overhead according to an embodiment of the present invention.

FIG. 3 is a chart showing the flow of calls when performing a transaction in a distributed database using XA protocol according to an embodiment of the invention.

At step 302, xa_open may be called by the transaction manager to initialize one or more resource managers 122, 124 and prepare them for use in a distributed transaction environment. All participating resource managers must respond to the transaction manager to acknowledge successful performance of the xa_open routine before the transaction proceeds (or communicate an exception if the routine failed). Note that xa_open is not actually implemented by Java XA such as Oracle® WebLogic Server but is implemented in C implementations such as Oracle® Tuxedo.

At step 304, xa_start is called. However, as described above, when xa_start is called by the application server it is done with a special DEFERRED flag rather than the TMNOFLAGS flag used currently. The use of the special DEFERRED flag sets a flag locally on the application server 106 and does not make a remote call to the resource manager 122, 124 for xa_start.

At step 306, the application 102, 104 goes ahead with the transaction without waiting for a response to the xa_start call (which was deferred rather than actually transmitted). The connection/statement execute/work call can be bundled with the xa_start call. When the connection/statement execute/work call is made, the resource manager receives the request and conducts the necessary work that would have resulted from both an explicit xa_start call and also conducts the work required by the connection/statement execute/work call. The resource manager determines the existence of the xa_start call from the connection/statement execute/work call without requiring communication of an explicit xa_start call.

Note that, the connection/statement execute/work call (step 306) is made by the application 102, 104 to the resource manager 122, 124 over the native interface 142, 144 using e.g. SQL commands. When the resource manager conducts the necessary work that would have resulted from an explicit xa_start an XA exception could result. Also, when the resource manager conducts the necessary work for the actual/statement work a SQL exception can occur. Either of these exceptions will be transmitted from the resource manager in the form of a SQL exception thrown in response to the connection/statement execute/work call. However, the SQLException will inherit or nest an XAException if it was actually an XAException that was thrown.

At step 308, xa_end is called by the transaction manager 110 to mark the end of the transaction on each transaction branch and dissociate an application thread from the transaction branches. All participating resource managers must respond to the transaction manager to acknowledge successful performance of the xa_end routine before the transaction proceeds (or communicate an exception if the routine failed).

At step 310, xa_prepare is called by the transaction manager as the first phase of the two phase commit. All participating resource managers must respond to the transaction manager to acknowledge successful performance of the xa_prepare routine for the transaction to succeed.

At step 312, if one or more of the resource managers do not respond positively to the xa_prepare call, xa_rollback is called by the transaction manager.

At step 314, if all of the resource managers respond positively to the xa_prepare call, xa_commit is called by the transaction manager.

At step 316, if one or more of the resource managers do not respond positively to the xa_commit call, depending on the XA error code returned, xa_commit will be retried or the transaction will be abandoned at step 317. At this point the transaction has either succeeded and been committed on all participating resource managers or has failed and been rolled back on all participating resource managers. The transaction thus satisfies the atomicity requirement of the global transaction—namely, a global transaction can be treated as a specific sequence of operations that are characterized by the four properties of atomicity, consistency, isolation, and durability (ACID).

Finally, at step 318 the transaction manager 110 calls xa_close to all of the participating resource managers 122, 124. The above sequence of steps is performed for each transaction performed by the applications using the resources. Note however that xa_open and xa_close are typically only called on application startup and application shutdown instead rather than for each transaction. Note also that xa_open and xa_close are not actually implemented by Java XA such as Oracle® WebLogic Server but are implemented in C implementations such as Oracle® Tuxedo.

Using the steps of FIG. 3, the communications overhead is reduced by deferring the xa_end call and either bundling it with the xa_prepare call (or xa_commit call) allowing the resource manager to determine the existence of the xa_end call from the receipt of the subsequent xa_prepare call (or xa_commit call) at the resource manager thus eliminating an entire network call for each resource manager in each transaction. The elimination of an entire network call for each resource manager in each transaction reduces the communications overhead and delay compared to the conventional transaction pattern.

The present invention may be conveniently implemented using one or more general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A computer-implemented method for improving efficiency in a distributed transaction environment, the method comprising:
receiving a request from an application to begin a transaction; deferring sending of an xa_start request from a transaction manager to a resource manager; allowing said application to transmit a work/execute statement to the resource manager; determining an existence of said xa_start request by said resource manager from said work/execute statement sent to said resource manager without requiring communication of said xa_start request; and performing on said resource manager work in response to determining the existence of said xa_start request and work in response to said work/execute statement.

2. The method of claim 1, wherein:
the request from the application includes a DEFFERED flag; and
the transaction manager sets a flag locally in response to receiving said request which includes the DEFERRED flag.

3. The method of claim 1, wherein:
the request from the application includes a DEFERRED flag;
the transaction manager sets a flag locally in response to receiving said request which includes the DEFERRED flag; and
wherein allowing said application to transmit a work/execute statement to the resource manager comprises allowing said application to transmit a work/execute statement to the resource manager without waiting for a response from said resource manager.

4. The method of claim 1, wherein:
the request from the application includes a DEFERRED flag;
the transaction manager sets a flag locally in response to receiving said request which includes the DEFERRED flag; and
wherein allowing said application to transmit a work/execute statement to the resource manager comprises allowing said application to transmit a work/execute statement to the resource manager without waiting for a response from said resource manager wherein the work/execute statement is bundled with an xa_start call.

5. The method of claim 1, wherein:
the request from the application includes a DEFERRED flag;
the transaction manager sets a flag locally in response to receiving said request which includes the DEFERRED flag; and
wherein allowing said application to transmit a work/execute statement to the resource manager comprises allowing said application to transmit a work/execute statement to the resource manager without waiting for a response from said resource manager wherein the resource manager infers the content of the an xa_start request from the work/execute statement.

6. The method of claim 1, wherein:
the request from the application includes a DEFERRED flag;
the transaction manager sets a flag locally in response to receiving said request which includes the DEFERRED flag;
wherein allowing said application to transmit a work/execute statement to the resource manager comprises allowing said application to transmit a work/execute statement to the resource manager without waiting for a response from said resource manager wherein the resource manager infers the content of the an xa_start request from the work/execute statement; and
wherein the resource manager transmits a response to the application which includes a response to the work/execute statement and a response to the inferred content of the xa_start request.

7. The method of claim 1, wherein:
the resource manager receives the execute/work statement and determines whether an XA transaction is required to be started;
the resource manager performs the execute/work statement without starting an XA transaction when it determines an XA transaction is not required to be started.

8. A distributed transaction environment comprising: an application server comprising a microprocessor and a memory an application operating on said application server; a transaction manager operating on said application server; and a plurality of resource managers; wherein the distributed transaction environment is configured to, receive a request from the application to begin a transaction; defer sending of an xa_start request from the transaction manager to one or more of said plurality of resource managers; allow said application to transmit a work/execute statement to said one or more of said plurality of resource managers; determine an existence of said xa_start request by said resource manager from said work/execute statement without requiring communication of said xa_start request; and perform on said one or more of said plurality of resource managers work in response to determining the existence of said xa_start request and work in response to said work/execute statement.

9. The distributed transaction environment of claim 8, wherein:
the request from the application includes a DEFERRED flag; and
the transaction manager sets a flag locally in response to receiving said request which includes the DEFERRED flag.

10. The distributed transaction environment of claim 8, wherein:
the request from the application includes a DEFERRED flag;

the transaction manager sets a flag locally in response to receiving said request which includes the DEFERRED flag; and wherein allowing said application to transmit a work/execute statement to the resource manager comprises allowing said application to transmit a work/execute statement to the resource manager without waiting for a response from said resource manager.

11. The distributed transaction environment of claim 8, wherein:

the request from the application includes a DEFERRED flag;

the transaction manager sets a flag locally in response to receiving said request which includes the DEFERRED flag; and wherein allowing said application to transmit a work/execute statement to the resource manager comprises allowing said application to transmit a work/execute statement to the resource manager without waiting for a response from said resource manager wherein the work/execute statement is bundled with an xa_start call.

12. The distributed transaction environment of claim 8, wherein:

the request from the application includes a DEFERRED flag;

the transaction manager sets a flag locally in response to receiving said request which includes the DEFERRED flag; and wherein allowing said application to transmit a work/execute statement to the resource manager comprises allowing said application to transmit a work/execute statement to the resource manager without waiting for a response from said resource manager wherein the resource manager infers the content of an xa_start request from the work/execute statement.

13. The distributed transaction environment of claim 8, wherein: the request from the application includes a DEFERRED flag; the transaction manager sets a flag locally in response to receiving said request which includes the DEFERRED flag; wherein allowing said application to transmit a work/execute statement to the resource manager comprises allowing said application to transmit a work/execute statement to the resource manager without waiting for a response from said resource manager wherein the resource manager infers the content of the an xa_start request from the work/execute statement; and wherein the resource manager transmits a response to the application includes a response to the work/execute statement which and a response to the inferred content of the xa_start request.

14. The distributed transaction environment of claim 8, wherein:

the resource manager receives the execute/work statement and determines whether an XA transaction is required to be started;

the resource manager performs the execute/work statement without starting an XA transaction when it determines an XA transaction is not required to be started.

15. A non-transitory computer-readable medium including instructions stored thereon for improving efficiency in a distributed transaction environment method, which instructions, when executed, cause the distributed transaction environment to perform steps comprising: receiving a request from an application to begin a transaction; deferring sending of an xa_start request from a transaction manager to a resource manager; allowing said application to transmit a work/execute statement to the resource manager; determining an existence of said xa_start request by said resource manager from said work/execute statement sent to said resource manager without requiring communication of said xa_start request; and performing on said resource manager work in response to determining the existence of said xa_start request and work in response to said work/execute statement.

16. The non-transitory computer-readable medium of claim 15, including further instructions stored thereon for improving efficiency in a distributed transaction environment method, which instructions, when executed, cause the distributed transaction environment to perform further steps comprising:

the request from the application includes a DEFERRED flag; and the transaction manager sets a flag locally in response to receiving said request which includes the DEFERRED flag.

17. The non-transitory computer-readable medium of claim 15, including further instructions stored thereon for improving efficiency in a distributed transaction environment method, which instructions, when executed, cause the distributed transaction environment to perform further steps comprising:

the request from the application includes a DEFERRED flag;

the transaction manager sets a flag locally in response to receiving said request which includes the DEFERRED flag; and wherein allowing said application to transmit a work/execute statement to the resource manager comprises allowing said application to transmit a work/execute statement to the resource manager without waiting for a response from said resource manager.

18. The non-transitory computer-readable medium of claim 15, including further instructions stored thereon for improving efficiency in a distributed transaction environment method, which instructions, when executed, cause the distributed transaction environment to perform further steps comprising:

the request from the application includes a DEFERRED flag;

the transaction manager sets a flag locally in response to receiving said request which includes the DEFERRED flag; and wherein allowing said application to transmit a work/execute statement to the resource manager comprises allowing said application to transmit a work/execute statement to the resource manager without waiting for a response from said resource manager wherein the work/execute statement is bundled with an xa_start call.

19. The non-transitory computer-readable medium of claim 15, including further instructions stored thereon for improving efficiency in a distributed transaction environment method, which instructions, when executed, cause the distributed transaction environment to perform further steps comprising:

the request from the application includes a DEFFERED flag;

the transaction manager sets a flag locally in response to receiving said request which includes the DEFERRED flag; and wherein allowing said application to transmit a work/execute statement to the resource manager comprises allowing said application to transmit a work/execute statement to the resource manager without waiting for a response from said resource manager wherein the resource manager infers the content of the an xa_start request from the work/execute statement.

20. The non-transitory computer-readable medium of claim 15, including further instructions stored thereon for improving efficiency in a distributed transaction environment method, which instructions, when executed, cause the distributed transaction environment to perform further steps comprising: the request from the application includes a DEFERRED flag; the transaction manager sets a flag locally in response to receiving said request which includes the DEFERRED flag; wherein allowing said application to transmit a work/execute statement to the resource manager comprises allowing said application to transmit a work/execute statement to the resource manager without waiting for a response from said resource manager wherein the resource manager infers the content of the an xa_start request from the work/execute statement; and wherein the resource manager transmits a response to the application which includes a response to the work/execute statement and a response to the inferred content of the xa_start request.

\* \* \* \* \*

UNITED STATES PATENT AND TRADEMARK OFFICE
CERTIFICATE OF CORRECTION

PATENT NO. : 9,984,096 B2  
APPLICATION NO. : 15/087895  
DATED : May 29, 2018  
INVENTOR(S) : Parkinson et al.

Page 1 of 1

It is certified that error appears in the above-identified patent and that said Letters Patent is hereby corrected as shown below:

On the Title Page

Column 1, under Inventors, Line 8, delete "Los Altos Hill," and insert -- Los Altos Hills, --, therefor.

In the Specification

In Column 8, Line 30, delete "DEFFERRED" and insert -- DEFERRED --, therefor.

In Column 9, Lines 38-39, delete "DEFFERRED" and insert -- DEFERRED --, therefor.

In the Claims

In Column 11, Line 39, in Claim 2, delete "DEFFERRED" and insert -- DEFERRED --, therefor.

In Column 14, Line 59, in Claim 19, delete "DEFFERRED" and insert -- DEFERRED --, therefor.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*